UNITED STATES PATENT OFFICE.

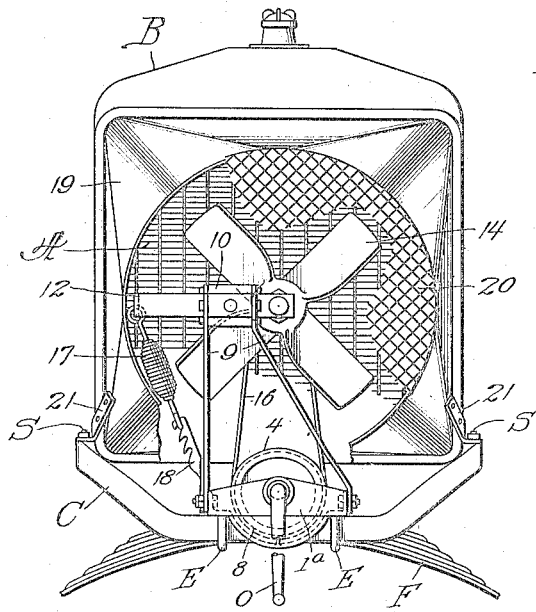
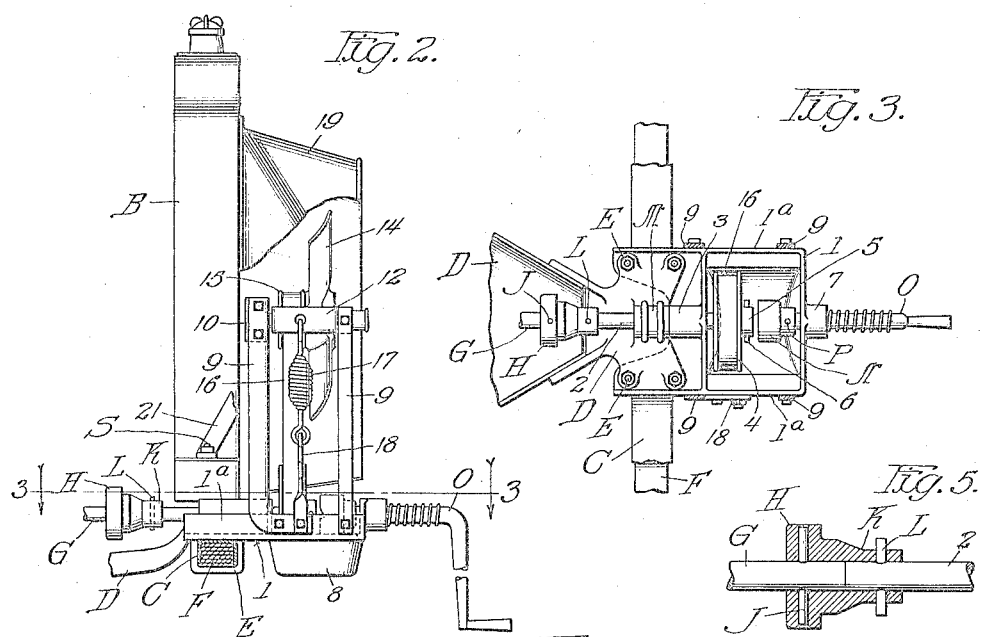
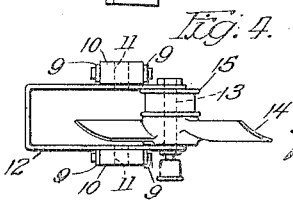

ADDISON N. CALKINS, OF QUINCY, ILLINOIS, ASSIGNOR TO ELECTRIC WHEEL COMPANY, OF QUINCY, ILLINOIS, A CORPORATION OF ILLINOIS.

AUXILIARY ENGINE-COOLING MEANS.

1,301,784.   Specification of Letters Patent.   Patented Apr. 22, 1919.

Application filed October 26, 1917. Serial No. 198,588.

*To all whom it may concern:*

Be it known that I, ADDISON N. CALKINS, a citizen of the United States, residing at Quincy, in the county of Adams and State of Illinois, have invented certain new and useful Improvements in Auxiliary Engine-Cooling Means, of which the following is a specification.

It has been proposed to employ automobiles, as, for example, Ford cars, as tractors to pull plows and other agricultural implements. Automobiles, however, are designed to run at considerable speed, and when subjected to the load incident to plowing and other agricultural operations, and driven at the low speed necessary in such operations, the radiator and the fan are unable to prevent overheating of the engine.

The object of my invention, generally stated, is to provide supplemental means to effect the cooling of the engine and the jacket water. This object I have attained by providing in front of the radiator a fan of large capacity and efficiency, said fan being driven from an extension of the engine crank-shaft, and by inclosing the fan in a housing which confines and directs the air current so that the latter is compelled to pass through the air spaces in the radiator.

A further object of the invention is to provide a device for the purpose mentioned which shall be of simple construction and of such nature that it may be readily installed upon the automobile by a person inexperienced in mechanical matters, and without drilling or cutting any parts.

In the accompanying drawings, Figure 1 is a fragmental front elevation showing an embodiment of my invention. Fig. 2 is a fragmental view looking from the left-hand side of Fig. 1. Fig. 3 is a sectional view taken in the plane of dotted line 3—3 of Fig. 2. Fig. 4 is a fragmental top plan view of the fan support. Fig. 5 is a sectional detail view.

The drawings show the radiator A, the radiator shell B and the bolster C of a Ford automobile. D is the forward portion of the Ford motor base, said base being secured to the bolster C by means of the usual U-bolts or clips E, said U-bolts also serving to secure the front springs F to the bolster.

The auxiliary fan and its driving pulleys are supported by means of a base 1 which is of approximately rectangular form. The rear portion of the base 1 is adapted to fit between the bolster C and the engine base D, and is provided with openings through which the U-bolts E may extend whereby said bolts may be employed to clamp the base 1 between the bolster C and the engine base D. G denotes the engine crank-shaft, H the pulley for the belt that drives the fan (not shown) which is located between the radiator and the engine, said pulley being secured to the engine shaft by means of a pin J. The pulley H is provided with a forwardly extending hub K (Fig. 5). Into the forward end of such hub is inserted a shaft 2, said shaft being secured to the hub by means of the pin L that normally is engaged by the starting crank. The shaft 2 is rotatably mounted within the bearing M (Fig. 3) on the front end of the engine base D, said bearing being the one in which the starting crank is commonly supported. The shaft 2 also extends through a bearing 3 on the base 1 and carries at its forward end a flanged belt pulley 4. The pulley 4 is provided with a forwardly extending hub 5. A pin 6 extends through the hub 5 and the shaft 2 and thus serves to secure the pulley 4 on the shaft. The ends of the pin 6 project beyond the hub 5 and serve for engagement by the socketed head N of the standard Ford starting crank O. The forward end of the base 1 is provided with a bearing 7 in which the crank O is rotatably mounted. The head N is secured to the crank O by means of a pin P.

The base comprises a chamber or pan 8 (Fig. 2) which serves to inclose and protect the lower portion of the pulley 4.

The longitudinal sides of the base 1 are in the form of vertical flanges 1ª to which are secured upwardly extending brackets 9. To the upper ends of these brackets are secured blocks 10 (Figs. 1 and 4) having alined bearings 11 to receive the pivots or trunnions of a bail-shaped frame 12. One end of the frame 12 carries a shaft 13 upon which are mounted a fan 14 and a flanged pulley 15, said fan and pulley being rigidly connected together. 16 is a belt communicating power from the pulley 4 to the pulley 15. The belt 16 is maintained taut by means of a tension spring 17, one end of said spring being connected to the end of the frame 12 which is opposite to the fan, and the other end of the spring being adjustably connected to a bracket 18 fixed to the base 1.

Projecting forwardly from the radiator A is a housing 19 which incloses the fan and surrounds the forward side of the radiator, the rear perimetral edge of the housing being of substantially the same form and dimensions as the perimeter of the radiator. The forward side of the housing 19 is open save that it is provided with a screen or guard 20. The lower portion of the housing has an opening through which the brackets 9 and 18 and the upper portion of the pulley 4 project. The housing 19 may be secured in place in any suitable manner; herein are shown brackets 21 attached to the housing and perforated to fit upon the threaded studs S that secure the radiator shell to the bolster C.

In practice the auxiliary cooling means hereinbefore described is installed as follows: The pin P is removed, thus separating the socket N from the crank O and permitting the crank to be withdrawn from the bearing M. The pin L is removed from the hub K. The U-bolts E are then removed and the engine base D raised sufficiently to permit the base 1 to be inserted between the bolster C and the engine base D. As the base 1 is being put in place, the shaft 2 is inserted into the bearing M. The U-bolts E are then replaced, thereby securing the base 1 rigidly in position with the bearings 3 and 7 on the base 1 in alinement with the bearing M on the engine base D. The shaft 2 having been inserted into the hub K, the pin L is driven through said hub and shaft. The crank O is then inserted into the bearing 7 and the head N attached to the crank by means of the pin P. The housing 19 is then set in place and securely fastened by means of the studs S.

In operation, the shaft 2 is driven by the engine, thus causing the fan 14 to be rotated and thereby forcing a strong current of air through the radiator A. As indicated in the drawings, the pulleys 4 and 15 are of such size as to cause the fan to be driven at relatively high speed. Preferably the fan 14 is larger than the fan commonly used behind the radiator of a Ford car and its blades are of such form as to afford large capacity and high efficiency. The primary purpose of the housing 18 is to confine and direct the air current so that it shall be compelled to pass through the radiator instead of being largely dissipated as would be the result if the housing were omitted.

The pulley 4 being in front of the radiator, it and the belt 16 are out of reach of the oil and grease from the engine and hence the belt does not become slippery. The belt is maintained under proper tension at all times by the spring 17.

It will be seen that the device herein disclosed is very compact and simple and capable of being easily and quickly installed upon the automobile.

I claim as my invention:

1. A motor vehicle having, in combination, an engine shaft, a radiator located in a plane above said shaft, a base, a rear bearing on said base, a shaft mounted in said bearing and connected to the end of the engine shaft, a pulley on said shaft, a fan supported by the base and driven by the second mentioned shaft, said fan being located directly in front of said radiator, a front bearing on said base, a starting crank rotatably mounted in said front bearing, and means on the front end of the second mentioned shaft for engagement by said starting crank.

2. An attachment for a motor vehicle, having, in combination, a base, a rear bearing on said base, a shaft mounted in said bearing, a pulley on said shaft, a bracket extending upwardly from said base, a fan and a pulley rigidly secured together and carried by said bracket, a belt connecting said pulleys, a front bearing on said base, a starting crank rotatably mounted in said front bearing, and means on the front end of said shaft for engagement by said starting crank.

3. An attachment for a motor vehicle having, in combination, a base, a rear bearing on said base, a shaft mounted in said bearing, a pulley on said shaft forwardly of said bearing, a bracket extending upwardly from said base, a fan carried by said bracket and driven by said pulley, a front bearing on said base, a starting crank rotatably mounted in said front bearing, and means on the front end of said shaft for engagement by the rear end of said starting crank.

4. A motor vehicle having, in combination, an engine base, a bolster, a base between the bolster and the engine base and projecting forwardly from the bolster, means for securing said bases to the bolster, a bracket on and extending upwardly from the second mentioned base, a fan carried by said bracket, a shaft mounted on the second mentioned base, a driving connection between the said shaft and the fan, an engine shaft, and a driving connection between said shafts.

5. A motor vehicle having, in combination, a radiator, a base projecting forwardly of and below the radiator, a bracket extending upwardly from said base in front of the radiator, a frame pivoted upon the bracket, a pulley and a fan rotatably carried at one end of said frame in front of the middle portion of the radiator, tension-spring means connecting the other end of said frame to the base, a shaft on the base, a pulley on said shaft, and a belt connecting said pulleys.

6. A motor vehicle having, in combination, a radiator, a radiator shell surrounding the radiator, an engine shaft behind the radiator, a fan supported in front of the radiator, a driving connection between the engine shaft and the fan, and a housing inclosing the fan and serving to direct the air current through the air spaces of the radiator, the front end of the housing being open for the admission of air, the rear perimetral edge of the housing being of approximately the same size and form as the perimeter of the radiator.

7. A motor vehicle having, in combination, a radiator, an engine shaft behind the radiator, a fan supported in front of the radiator, a driving connection between the engine shaft and the fan, and a housing inclosing the fan and serving to direct the air current through the air spaces of the radiator, the front end of the housing being open for the admission of air.

8. An attachment for a motor vehicle having, in combination, an approximately rectangular base having attaching openings in its rear end, a shaft bearing on the base near the rear end thereof, a shaft bearing on the base at the front end thereof, a shaft mounted in said bearings, a pulley fixed on the shaft between said bearings, a bracket fixed to the base and rising therefrom, a fan and fan pulley carried by the upper end of the bracket, and a belt connecting said pulleys.

In testimony whereof, I have hereunto set my hand.

ADDISON N. CALKINS.